(12) United States Patent
Chen et al.

(10) Patent No.: US 8,731,401 B2
(45) Date of Patent: May 20, 2014

(54) DENSE WAVELENGTH DIVISION MULTIPLEXING MULTI-MODE SWITCHING SYSTEMS AND METHODS FOR CONCURRENT AND DYNAMIC RECONFIGURATION WITH DIFFERENT SWITCHING MODES

(75) Inventors: Yuhua Chen, Houston, TX (US); Wenjing Tang, Houston, TX (US)

(73) Assignee: University of Houston, Houston, TX (US)

( * ) Notice: Subject to any disclaimer, the term of this patent is extended or adjusted under 35 U.S.C. 154(b) by 138 days.

(21) Appl. No.: 13/325,544

(22) Filed: Dec. 14, 2011

(65) Prior Publication Data

US 2012/0148242 A1    Jun. 14, 2012

Related U.S. Application Data

(60) Provisional application No. 61/422,783, filed on Dec. 14, 2010.

(51) Int. Cl.
*H04J 14/00* (2006.01)

(52) U.S. Cl.
USPC ............... 398/46; 398/51; 398/54; 398/57

(58) Field of Classification Search
USPC .......................... 398/45–52, 54–57
See application file for complete search history.

(56) References Cited

U.S. PATENT DOCUMENTS

| | | | |
|---|---|---|---|
| 6,721,315 B1 | 4/2004 | Xiong | |
| 6,876,649 B1 * | 4/2005 | Beshai | 370/355 |
| 6,882,799 B1 * | 4/2005 | Beshai et al. | 398/45 |
| 7,162,632 B2 * | 1/2007 | Cao et al. | 713/163 |
| 7,260,102 B2 * | 8/2007 | Mehrvar et al. | 370/412 |
| 2002/0054732 A1 * | 5/2002 | Zheng | 385/24 |
| 2002/0191250 A1 | 12/2002 | Graves | |
| 2006/0013226 A1 | 1/2006 | Ervin | |
| 2007/0242691 A1 | 10/2007 | Rhee | |

OTHER PUBLICATIONS

Shete et al., "Cost Analysis of DWDM Multi-Mode Switching Router", Jun. 13-16, 2010-2013, IEEE, Print-ISBN: 978-1-4244-6969-7, pp. 20-25.*

* cited by examiner

*Primary Examiner* — Dalzid Singh
(74) *Attorney, Agent, or Firm* — Winstead PC

(57) ABSTRACT

A Wavelength Division Multiplexing (WDM) multi-mode switching system and method and method provides concurrent switching in various switching modes. For example, WDM links may communicate data in various switching modes including, but not limited to, an electronic packet switching (EPS) mode, optical circuit switching (OCS) mode, and optical burst switching (OBS) mode. Edge routers and core routers in the WDM multi-mode switching systems and methods provide switching and processing necessary to handle data provided in the various switching modes. Further, the WDM multi-mode switching systems and methods can also provide dynamic reconfiguration between the various switching modes.

35 Claims, 14 Drawing Sheets

DENSE WAVELENGTH DIVISION MULTIPLEXING MULTI-MODE SWITCHING SYSTEMS AND METHODS FOR CONCURRENT AND DYNAMIC RECONFIGURATION WITH DIFFERENT SWITCHING MODES

RELATED APPLICATIONS

This application claims the benefit of U.S. Provisional Patent Application No. 61/422,783 to Chen et al., filed on Dec. 14, 2010, which is incorporated herein by reference.

STATEMENT REGARDING FEDERALLY SPONSORED RESEARCH

This invention was made with government support under Grant Nos. CNS-0708613, CNS-0923481 and ECCS-0926006 awarded by the National Science Foundation. The government has certain rights in the invention.

FIELD OF THE INVENTION

This invention relates to multi-mode switching systems and methods. More particularly, to concurrent and dynamically reconfigurable dense wavelength division multiplexing (DWDM) multi-mode switching with different switching technology modes.

BACKGROUND OF INVENTION

Wavelength-division multiplexing (WDM) is a technology which multiplexes a number of optical carrier signals onto a single optical fiber by using different wavelengths. Dense Wavelength Division Multiplexing (DWDM) technology greatly expands network capacity over existing network infrastructures by allowing the simultaneous transmission of hundreds of wavelengths over a single fiber. DWDM transmission has been used in a variety of applications, including, but not limited to, long haul service provider networks, metro service provider networks, enterprise data center connectivity, and the like. While DWDM is used in transmission, different switching technologies can be used to direct input data to outputs at router nodes. WDM and DWDM are used interchangeable herein to refer to WDM, DWDM, or both.

Current switching technologies fall into either electronic switching or optical switching technologies, based on how data is processed in the router. Electronic switching technology, also known as electronic packet switching (EPS), converts DWDM optical signals to electronic signals, and processes data (usually in the form of packets) electronically. However, as the number of DWDM channels increases, the optical/electrical/optical (O/E/O) conversion required by electronic switching significantly adds cost to the overall system cost. For example, while it is technologically feasible to carry 512 wavelengths in a single optical fiber, it requires 512 O/E/O pairs in EPS routers to just terminate a single DWDM link. Optical switching technologies, on the other hand, allow DWDM channels to pass through a node optically, which greatly reduces the cost of deploying DWDM channels over existing network infrastructure by reducing the need for O/E/O pairs. Optical switching can be further divided into three technologies: Optical Circuit Switching (OCS), Optical Packet Switching (OPS), and Optical Burst Switching (OBS). Unfortunately, there is no single switching technology that can cost-effectively scale with the number of DWDM channels while meeting the diverse needs of heterogeneous applications.

From an application's perspective, Internet traffic is inherently heterogeneous, embracing all data generated by applications that differ greatly in nature (e.g., VoIP, Video-on-Demand (VoD), IPTV, 3G/WiMax, Virtual-Private-Network (VPN), 10 Gigabit Ethernet). Each of the switching technologies (EPS, OCS or OBS) advantages and disadvantages for different applications. Although optical switching technologies have advantages in scaling up DWDM systems, neither OCS nor OBS can switch at the packet level. However, fine packet level granularity is desirable when transporting short, latency sensitive messages. Even between the two optical switching technologies, OCS and OBS, it is difficult to determine which is best for all types of applications. While it is clear that OBS performs well for most bursty Internet traffic, OCS is more suitable for applications that require sustained, long-term full channel bandwidth use (i.e. 10 Gb/s and above). OCS is also a better fit for mission critical applications which cannot tolerate any data loss or variable delay. One can conceivably build separate networks using different switching technologies to meet respective needs of applications. However, for some applications, this implies a higher capital investment, more management issues, and less flexibility. Unfortunately, there is no single type of network that can best fit the need for all types of applications due to the varying characteristics of different types of messages within each application. Although attempts have been made to support specific applications in the network, none of them address the DWDM channel scaling issue.

Dense Wavelength Division Multiplexing (DWDM) multi-mode switching systems and methods overcome the above-mentioned limitations by offering a unified approach to DWDM-based communication networks. DWDM multi-mode switching systems and methods provide for the use of multiple switching technologies (e.g. EPS, OBS and OCS) in the same network, on the same router platform, and at the same time. Additionally, DWDM multi-mode switching systems and methods also allow wavelength conversion in the various switching modes. Further, DWDM multi-mode switching systems and methods allow individual DWDM channels in the optical fiber to be dynamically reconfigured in EPS, OCS, or OBS modes, and switched using corresponding switching technologies within a router. DWDM multi-mode switching systems and methods support a large number of DWDM channels cost effectively by maintaining a relatively small set of shared electronic switching ports. With such architecture, each DWDM channel can be individually reconfigured to a different switching mode based on the dynamic traffic load. For example, individual applications or individual types of messages within an application can choose the mode that best suits its need.

SUMMARY OF THE INVENTION

In one illustrative implementation, a Wavelength Division Multiplexing (WDM) multi-mode switching system and method provides concurrent switching in various switching modes. For example, DWDM links may communicate data in various switching modes including, but not limited to, an electronic packet switching (EPS) mode, optical circuit switching (OCS) mode, and optical burst switching (OBS) mode. Edge routers and core routers in the DWDM multi-mode switching systems and methods provide switching and processing necessary to handle data provided in the various switching modes. Further, the DWDM multi-mode switching systems and methods can also provide dynamic reconfiguration between the various switching modes.

In another illustrative implementation, a core router system for multi-mode switching includes a wavelength division multiplexed (WDM) input link receiving data, wherein the data is provided in an electronic packet switching (EPS) mode, optical circuit switching (OCS) mode, and optical burst switching (OBS) mode, and the data is provided in a plurality of channels that are allocated for one of the EPS mode, OCS mode, or OBS mode. The core router system also includes an optical switching fabric receiving the channels, wherein the optical switching fabric routes each of the plurality of channels to a desired output port in accordance with a switching mode; and an electronic switching fabric receiving electronic data, wherein the electronic switching fabric routes the electronic data to a desired electronic output port in accordance with the switching mode. The core router system also includes a WDM output link coupled to the optical switching fabric, wherein the WDM output link outputs outgoing WDM data.

In another implementation, an edge router system for multi-mode switching includes a line interface receiving incoming data for an electronic packet switching (EPS) mode, optical circuit switching (OCS) mode, and optical burst switching (OBS) mode. The edge router system also includes an ingress traffic manager coupled to the line interface, wherein the ingress traffic manager processes the incoming data in accordance with the EPS mode, OCS mode, or OBS mode; and a multiplexer coupled to the ingress traffic manager, wherein the multiplexer combines the incoming signals and outputs an outgoing wavelength division multiplexed (WDM) link. The edge router system also includes a demultiplexer receiving an incoming WDM link, wherein the demultiplexer separates the incoming WDM link into a plurality of channels; and an egress traffic manager coupled to the demultiplexer, wherein the egress traffic manager processes the plurality of channels in accordance with the EPS mode, OCS mode, or OBS mode.

In yet another implementation, a method for wavelength division multiplexed (WDM) multi-mode switching includes receiving at least one wavelength division multiplexed (WDM) link, wherein the WDM links provides a plurality of channels, and at least one of the plurality of channels is allocated for an electronic packet switching (EPS) mode, optical circuit switching (OCS) mode, and optical burst switching (OBS) mode. The method for WDM multi-mode switching also includes routing each of the plurality of channels to a desired output port of an optical switching fabric in accordance with an allocated switching mode corresponding to the channel; and combining a plurality of outputs from the optical switching fabric for output on at least one WDM output link.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
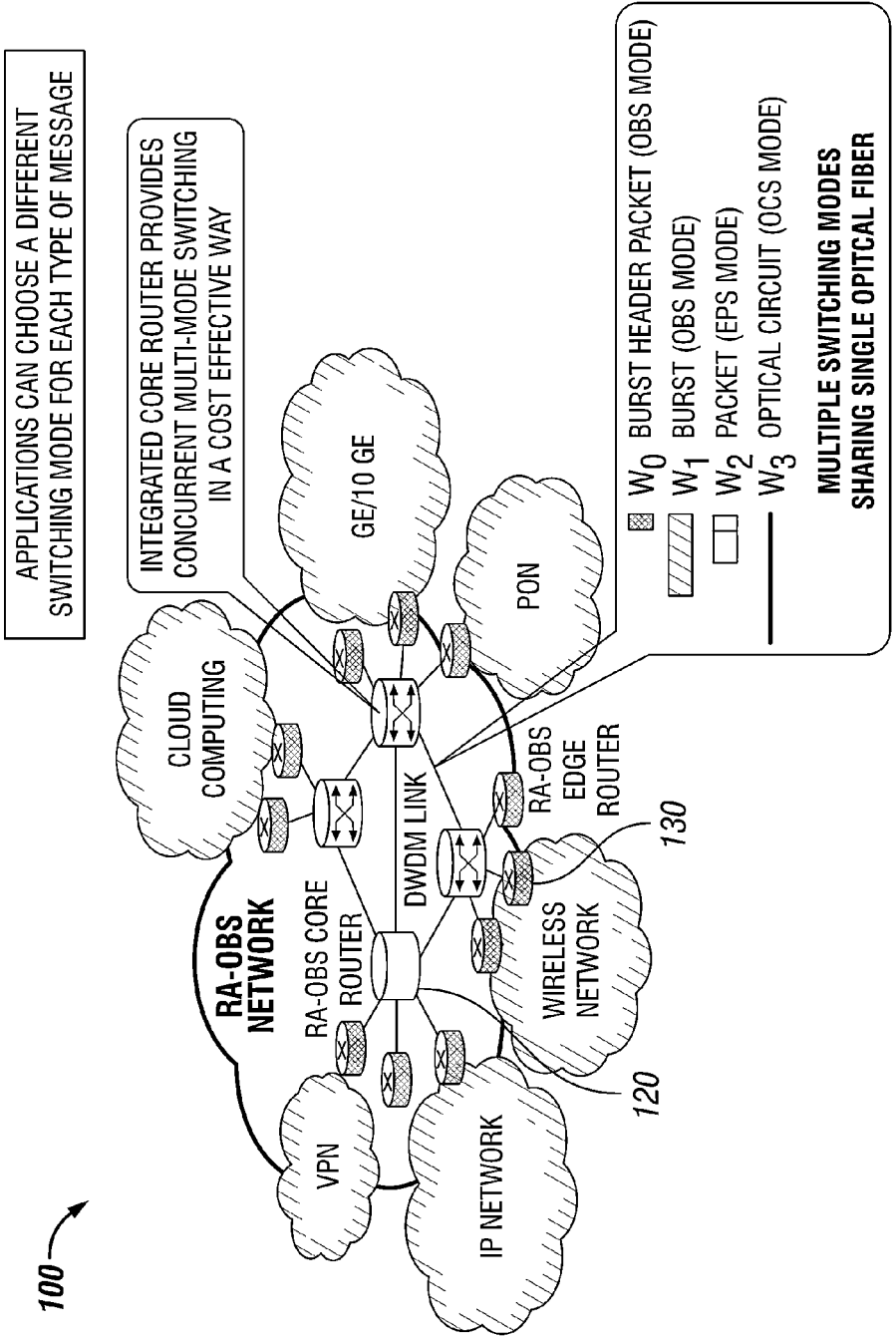
FIG. 1 is an illustrative implementation of Reconfigurable Asymmetric Optical Burst Switching (RA-OBS) network architecture.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Dense Wavelength Division Multiplexing (DWDM) technology has made it possible to carry hundreds of wavelength channels over a single optical fiber at rates of 10 Gb/s and beyond. DWDM technology enables vast network capacity expansion over existing network infrastructure. Unfortunately, there is no single switching technology that can cost-effectively scale to a large number of DWDM channels while meeting the diverse needs of heterogeneous applications. Although electronic packet switching (EPS) can switch at the packet level and provide a rich set of traffic management, the cost to support a large number of DWDM channels is high due to the cost of Optical/Electronic/Optical (O/E/O) conversion. For example, despite its rich set of traffic management capabilities, EPS requires hundreds of expensive optical/electrical/optical (O/E/O) converter pairs to just terminate a single DWDM link. On the other hand, while optical switching technologies can cost effectively scale to support a large number of DWDM channels, neither of the switching technologies, namely optical circuit switching (OCS) and optical burst switching (OBS), can switch at the packet level.

DWDM multi-mode switching systems and methods provide methods for supporting a large number of DWDM channels in a cost effective way. DWDM multi-mode switching systems and methods allow EPS, OCS, and OBS to be supported concurrently on an integrated router platform. DWDM multi-mode switching systems and methods may utilize a router that supports a large number of DWDM channels cost effectively by maintaining a relatively small set of shared electronic switching ports. With such architecture, each DWDM channel can be individually reconfigured into a different switching mode, based on the dynamic traffic load. The switching mode that best suits an individual applications or individual types of messages within an application can be selected accordingly.

FIG. 1 is an illustrative implementation of a reconfigurable asymmetric optical burst switching (RA-OBS) network 100 providing a set of RA-OBS edge router(s) 110 and RA-OBS core router(s) 120 connected by DWDM link(s) 130. RA-OBS edge routers 110 may interface with various networks including, but not limited to, virtual private networks (VPN), IP networks, wireless networks, passive optical networks (PON), Gigabit Ethernet (GE)/10 GE, cloud computing, or the like. In the RA-OBS network 100, each wavelength in a DWDM link can be individually configured for EPS, OCS or OBS modes. RA-OBS core router 120 switches data based on the mode configured for a given wavelength, and routes data accordingly. More specifically, a wavelength configured in the EPS mode is switched electronically on a packet by packet basis by the core router; a wavelength in the OCS mode is switched at the wavelength level using optical circuit switching; and a wavelength in the OBS mode is switched according to optical burst switching protocols. An application can choose a switching mode that is best suited for the characteristics of the entire application or vary switching modes for each message type within the application.

RA-OBS network 100 has the following characteristics:

Multimodal: The multimodal switching is provided for by the novel systems and methods discussed herein. Each individual DWDM wavelength channel may be allocated for a different switching mode, thereby allowing multiple switching modes to be utilized simultaneously. Each fiber can transmit multiple wavelengths, each utilizing different switching modes, to allow data to be transferred using multiple switching modes.

Reconfigurability: The reconfigurability comes from the fact that each individual DWDM wavelength channel in the proposed architecture can be reconfigured to carry traffic in different switching modes. In addition, the number of wavelengths in each fiber used for EPS, OCS and OBS can be dynamically reconfigured based on specific traffic demands.

Asymmetry: The asymmetry is due to the fact that in a two-way communication, different switching modes can be used in different directions to provide the best performance, taking into account the characteristics of the data in each direction. For example, in telesurgery applications, the OBS or OCS mode can be used for transferring medical quality 3D video from the patient site to the remote surgeon site, while using the EPS mode for short robot control messages from the remote surgeon site to the patient site.

Figure 2A:
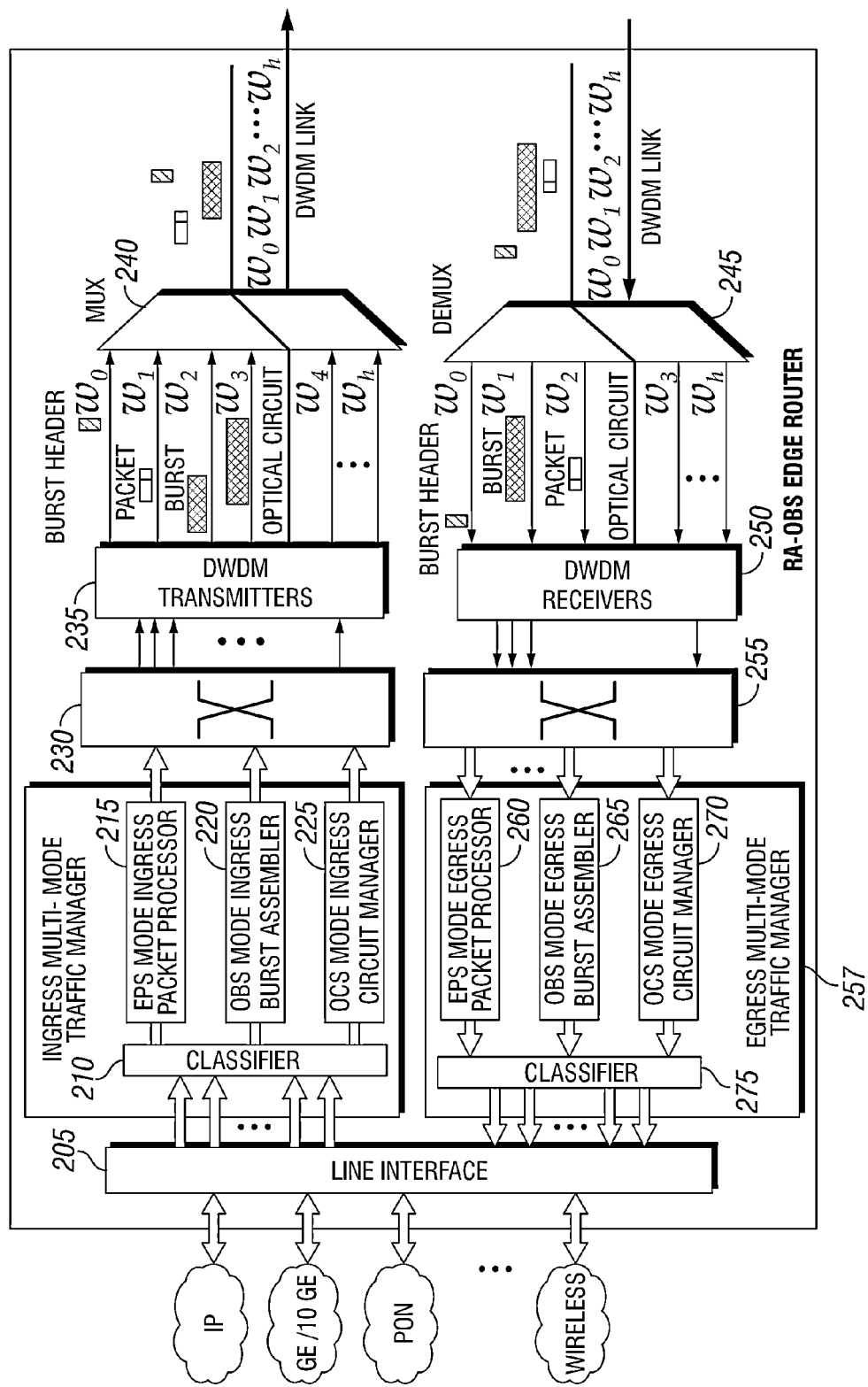
FIGS. 2a and 2b are illustrative implementations of (a) a RA-OBS edge router architecture, and (b) a RA-OBS core router architecture.

FIG. 2a is an illustrative implementation of an architecture for a RA-OBS edge router 200. In the ingress direction, packets may be received from various networks by line interface 205 and are sent to ingress traffic manager 207, which includes classifier 210 processors for various switching modes, for classification and separation according to a switching mode. Classification can be performed at the packet level or can be based on specific settings. For example, a particular line interface may specifically be associated with EPS, OBS, or OCS. Based on the results from classifier 210, the packets or traffic streams are processed according to one of the following switching modes: (1) EPS mode: Packets to be sent in the EPS mode are queued and transmitted on a packet by packet basis; (2) OBS mode: Packets or flows in the OBS mode are assembled into bursts according to the destination egress edge router address, and sent according to traditional OBS protocols; and (3) OCS mode: Packets belonging to an optical circuit are sent on the lightpaths set up by the optical circuit switching protocols. In accordance with the switching mode, the packets or traffic streams are processed by EPS mode ingress packet processor 215, OBS mode ingress burst assembler 220, or OCS mode ingress circuit manager 225. Switch 230 routes data to a desired location when outputting to DWDM transmitters 235. All wavelengths from the DWDM transmitters 235 are combined onto the outgoing DWDM link using a optical multiplexer (MUX) 240, such as a passive optical multiplexer. For example, packets for EPS, burst headers and burst for OBS, and optical signals for OCS are combined by MUX 240.

In the egress direction, the wavelengths on the incoming DWDM link are separated using an optical demultiplexer (DEMUX) 245. DWDM receivers 250 convert optical signals back to the electronic domain. Switch 255 routes data to the corresponding traffic processors in egress traffic manager 257 based on the switching modes of the wavelengths for switching mode specific processing. For example, packets for the EPS mode are sent to EPS mode egress packet processor 260; converted data bursts and burst header packets for OBS mode are sent to OBS mode egress burst assembler 265; and converted optical data for OCS mode is sent to OCS mode egress circuit manager 270. Egress classifier 275 inspects the data from the traffic processors and forwards the data to appropriated line interfaces 205 for output to the desired network.

Figure 2B:
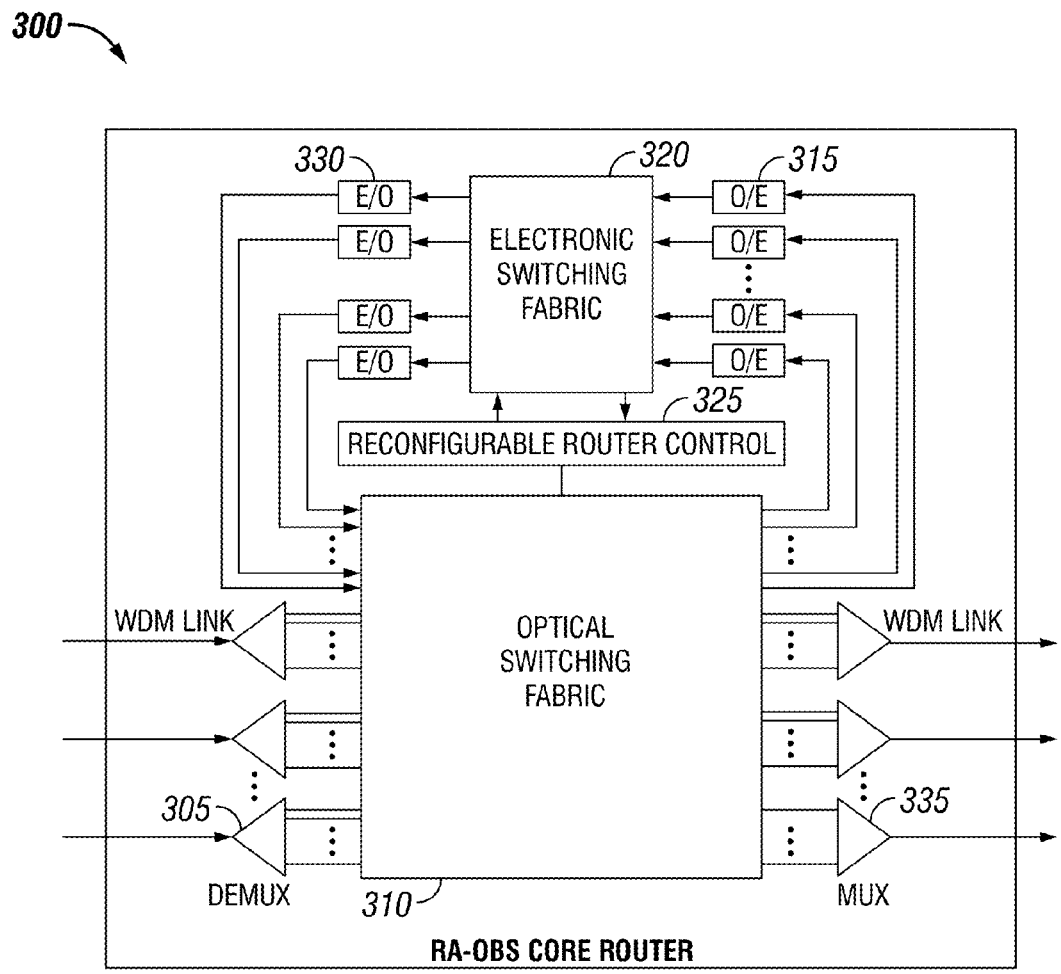

FIG. 2b is an illustrative implementation of a RA-OBS core router 300. RA-OBS core router 300 provides a novel architecture that can support the EPS, OCS and OBS modes on an integrated platform. With such core router architecture, a different switching mode can be dynamically reconfigured for each wavelength. RA-OBS core router(s) 300 connect to other RA-OBS core routers or edge routers using DWDM links. DWDM links received by RA-OBS core router 300 are demultiplexed by optical DEMUX 305 and sent to optical switching fabric 310. Optical switching fabric 310 routes the received data to a desired output wavelength. In each DWDM link, at least one of the wavelength channels is configured as a control wavelength. The control wavelength or RA-OBS control channel is used to send burst header packets as in traditional OBS networks, as well as control packets to dynamically reconfigure wavelengths in the EPS and OCS modes. The information carried on the control wavelengths are processed electronically by RA-OBS core router 300. Control wavelengths are routed through a pre-configured lightpath in the optical switching fabric to O/E converters 315. After being converting to an electronic form by O/E converters 315, control packets carried on the control wavelength are routed to electronic switching fabric 320. Electronic switching fabric 320 may provide a control packet to reconfigurable router control (RRC) unit 325 or to E/O converters 330 depending on the switching mode for the data. Control packets can be used for many purposes. For example, a control packet can be a burst header packet for setting a light path for the upcoming burst; it can be an EPS control packet, requesting to add/remove a wavelength to/from the EPS mode; or it can be an OCS optical circuit control packet setting up/tearing down an optical lightpath. Additionally, when dynamic reconfiguration to a different switching mode is desired, RRC unit 325 may process control data and/or other data accordingly for conversion to a different switching mode. For example, the control packet may be a EPS control packet, OCS control packet, or OBS control packet sent on a control wavelength for reconfiguring the received data to be output via a different switching mode. RRC unit 325 processes various control packets, and configures/reconfigures optical switching fabric 310 accordingly. The control packets are routed back through electronic switching fabric 320 and converted to an optical form by E/O converters 330.

Data wavelengths, or the wavelengths that are not allocated for control data, are used to carry data in the EPS, OCS and OBS modes. Data wavelengths are treated based on the switching modes they are configured for. For data wavelengths in the EPS mode, packets carried on these wavelengths are processed electronically by RA-OBS core router 300, and switched individually at the packet level. Data wavelengths in the OCS mode are transparently routed through optical switching fabric 310 to the desired output. Data wavelengths in the OBS mode are routed on a burst-by-burst basis in accordance with the burst control packets sent on the control wavelength. All data and control wavelengths of each output port are combined by optical MUX 335 onto the outgoing DWDM link.

Figure 3:
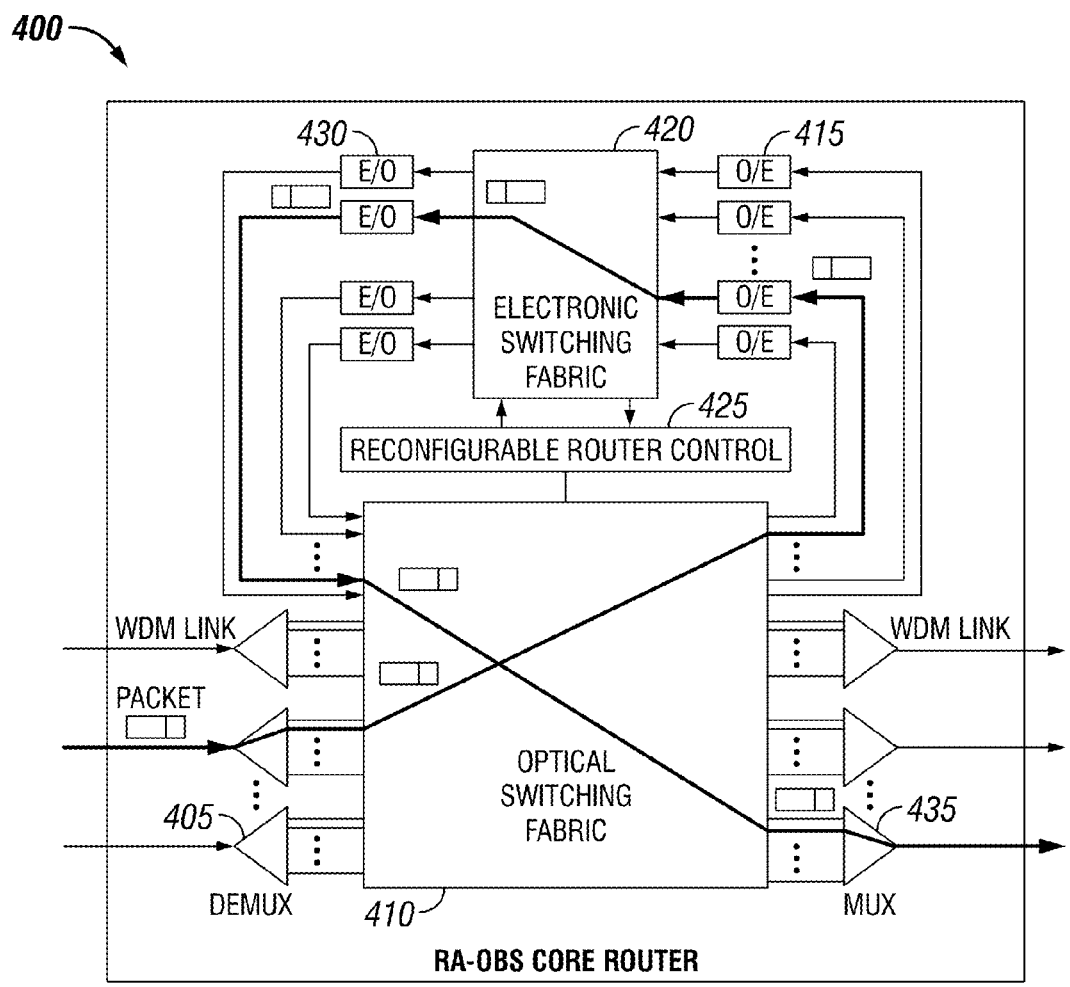
FIG. 3 is an illustrative implementation of a RA-OBS core router in a Electronic Packet Switching (EPS) mode.

FIG. 3 is an illustrative implementation of a configuration of RA-OBS core router 400 in an EPS mode. DWDM links are received by RA-OBS core router 400 and demultiplexed by DEMUX 405. One or more wavelengths may be configured for an EPS mode. All packets sent on the wavelengths configured for an EPS mode are switched electronically using electronic packet switching technology. To support the EPS mode in RA-OBS core router 400, a lightpath is pre-established in optical switching fabric 410 to route the incoming wavelength in the EPS mode to O/E converters 415. The packets are then processed electronically, similar to a traditional electronic packet router. The packets may be processed in an input port processor before being routed through electronic switching fabric 420, and then processed at the output ports to electronic switching fabric 420. Packets are converted to an output wavelength using E/O converters 430. Note that the packets are not processed by RRC unit 425 in the EPS mode. The output wavelength is routed through optical switching fabric 410 using a pre-established lightpath which is combined with other wavelengths using MUX 435 onto the outgoing DWDM link.

Figure 4A:
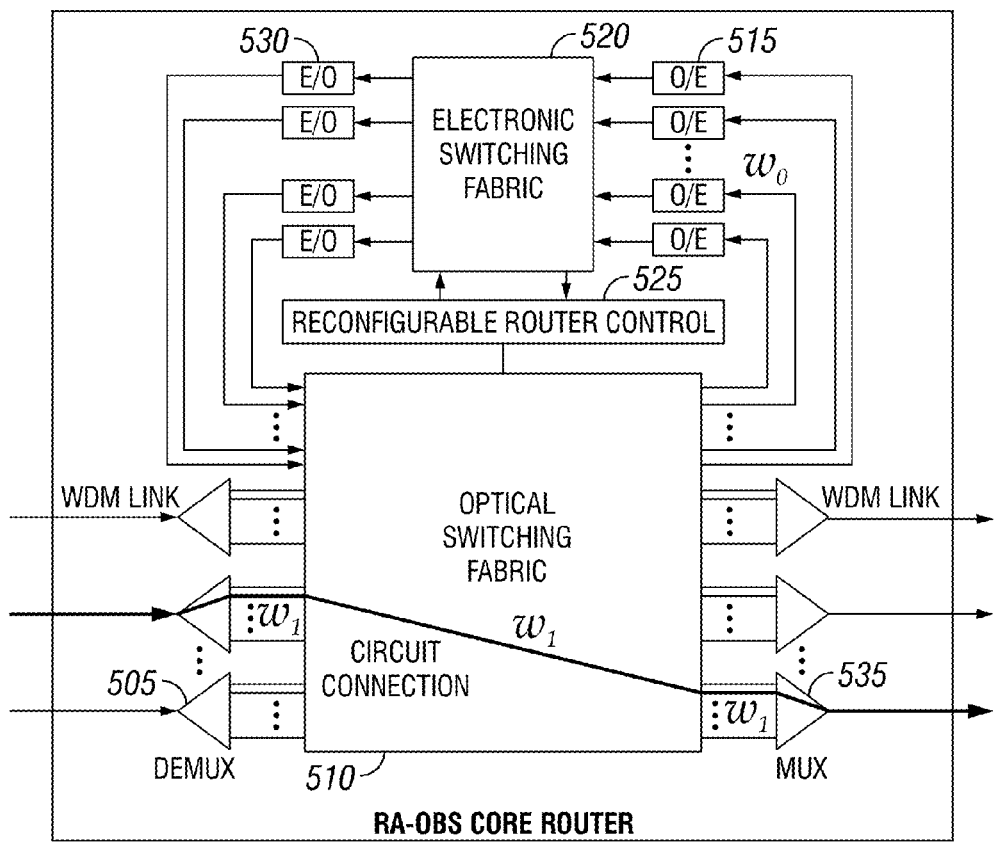
FIGS. 4a-4d are illustrative implementations of a RA-OBS core router in an (a) Optical Circuit Switching (OCS) mode without wavelength conversion, (b) OCS mode with wavelength conversion, (c) Optical Burst Switching (OBS) mode without wavelength conversion, and (d) OBS mode with wavelength conversion.

FIG. 4a shows the configuration of a RA-OBS core router 500 when used in the optical circuit switching (OCS) mode without wavelength conversion. OCS setup protocols can be used to establish the lightpath. DWDM links would be received and demultiplexed by DEMUX 505. Optical switching fabric 510 routes the wavelength to the correct output for multiplexing by MUX 535 before being outputted.

In FIG. 4a, the outgoing wavelength is the same as the incoming wavelength; however, in some cases, wavelength conversion may be desirable. For example, network utilization can be improved if the conversion of the wavelength is used to shift the incoming wavelength onto a different outgoing wavelength. While this may be achieved optically, unfortunately, all-optical wavelength conversion remains prohibitively expensive. A practical and economically feasible solution is to convert the optical signals back into the electrical domain, and retransmit them on a different wavelength using tunable lasers.

Figure 4B:
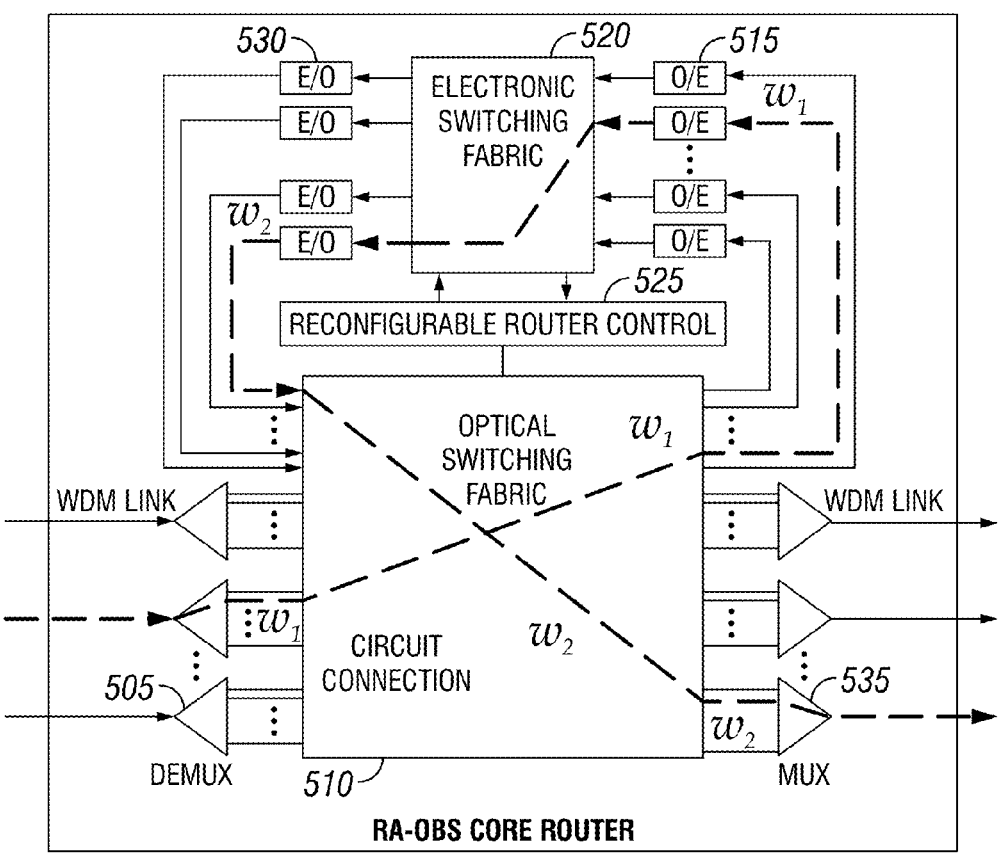

FIG. 4b illustrative implementations of a RA-OBS core router 500 in an OCS mode with wavelength conversion. Wavelengths from an incoming DWDM link are demultiplexed by DEMUX 505. To convert an incoming wavelength $w_1$ to an outgoing wavelength $w_2$, a lightpath is set up in optical switching fabric 510 to route the incoming wavelength $w_1$ to an O/E converter 515. Electronic switching fabric 520 directs the data from O/E converter 515 to its output port, where the signals is converted back to an optical signal by E/O converter 530 on the desired outgoing wavelength $w_2$. Outgoing wavelength $w_2$ is routed to the destined outgoing port by optical switching fabric 510 and multiplexed by MUX 535 for transmission onto the outgoing DWDM link. In some implementations, O/E and E/O converters may be arranged in close proximity so that direct connections can be made through port processors, thereby eliminating the need for the traffic to go through electronic switching fabric 520 for wavelength conversion.

Figure 4C:
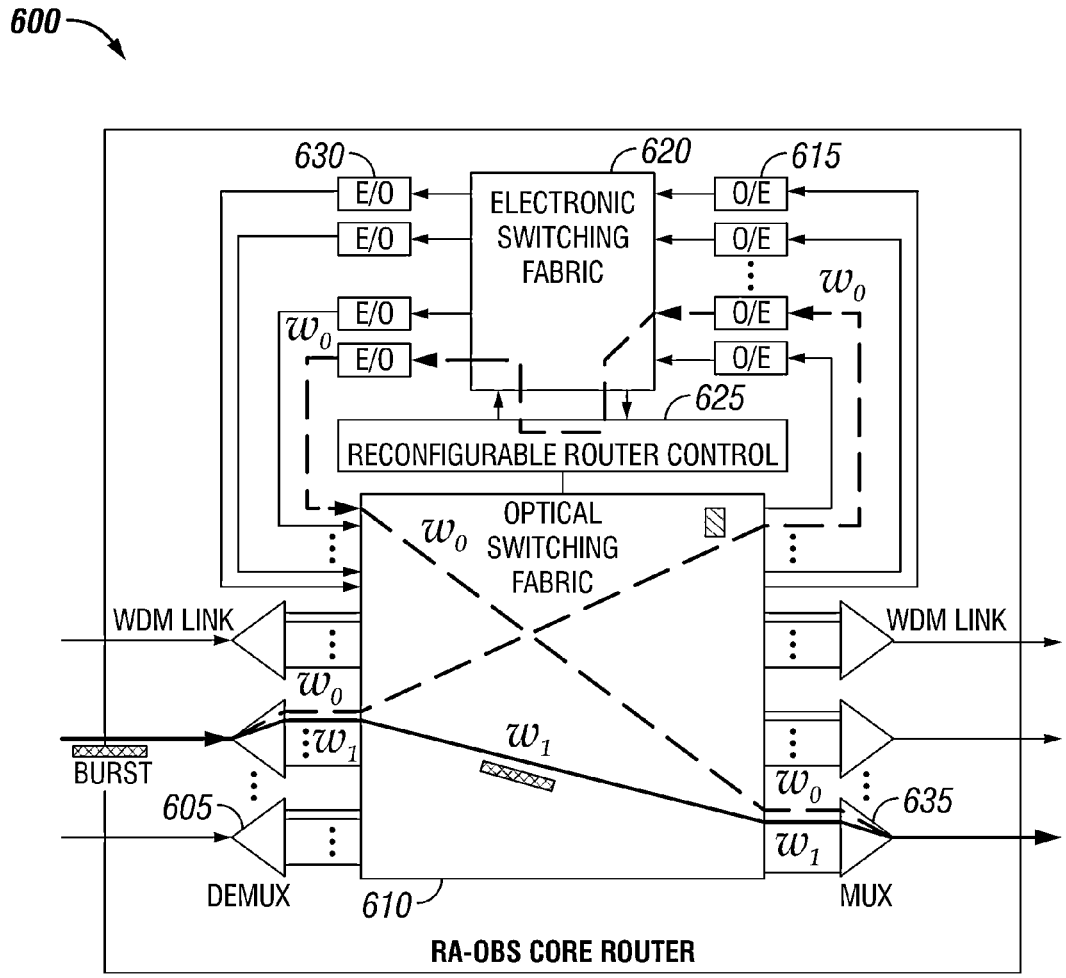

FIG. 4c is an illustrative implementation of a RA-OBS core router 600 in an OBS mode without wavelength conversion. Wavelengths from a DWDM link are demultiplexed by a DEMUX 605 and sent to optical switching fabric 610. A burst header packet arrives at RA-OBS core router 600 on the control wavelength $W_0$, which is directed to an O/E converter 615 through the optical switching fabric 610. The burst header packets are electronically routed through electronic switching fabric 620 to the RRC unit 625, where traditional OBS burst scheduling is implemented. Incoming data burst may be provides on one of the data wavelengths $W_1$ at an offset time from burst header packet. Optical switching fabric 610 is configured using information from burst header packet to route the data burst to the desired output for the duration of the burst. Burst header packet and data burst are outputted from optical switching fabric 610 on respective wavelengths $W_0$ and $W_1$, and the wavelengths are multiplexed with MUX 635 before outputting to the DWDM link. OBS mode may allow the burst to stay in the optical domain and pass through RA-OBS core router 600 without the need for optical buffering.

Figure 4D:
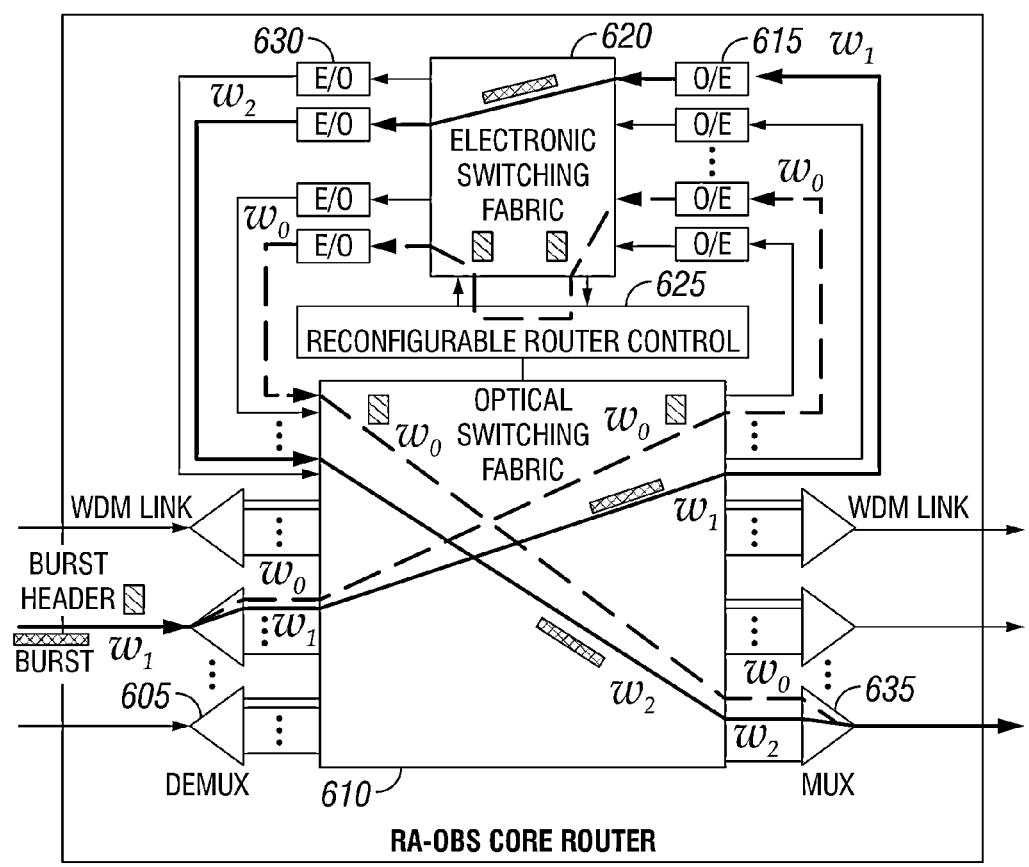

FIG. 4d is an illustrative implementation of a RA-OBS core router 600 in an OBS mode with wavelength conversion. The burst loss probability in OBS mode can be reduced if wavelength conversion is available. Since, as mentioned above, optical wavelength converters are currently very expensive, an alternative utilizing RA-OBS core router(s) 600 supporting wavelength conversion in the OBS mode may be provided for wavelength conversion. A burst header packet on control wavelength $W_0$ is directed to O/E converter 615 and processed by electronic switching fabric 620 and RRC unit 625. A burst scheduler first makes an effort to schedule the burst onto the same wavelength at the output, in which case, no wavelength conversion is needed. Otherwise, a different wavelength is assigned. To provide wavelength conversion to an outgoing wavelength $w_2$ different from the incoming wavelength $w_1$, optical switching fabric 310 directs the data burst to O/E converter 615. Electronic switching fabric 620 receives the data burst and directs it to E/O converter 630 to convert the data burst back to an optical signal at the desired wavelength $w_2$. Burst header packet on control wavelength $w_0$ and the data burst on wavelength $w_2$ are routed to MUX 635 for multiplexing and a desired output port.

Figure 5:
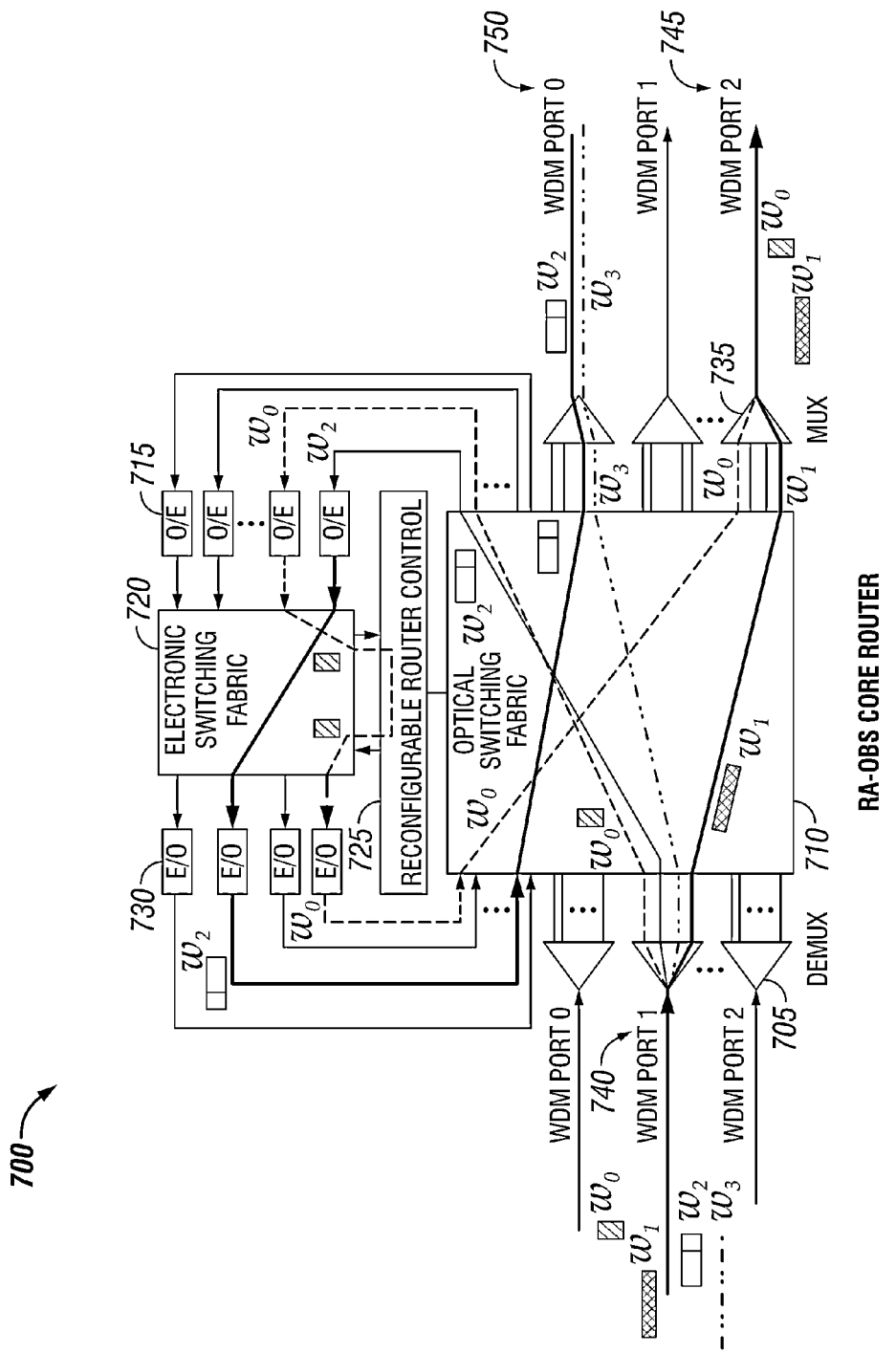
FIG. 5 is an illustrative implementation of concurrent multi-mode switching operations in RA-OBS core router.

FIG. 5 is an illustrative implementation of a RA-OBS core router 700 providing concurrent multi-mode switching or when all three switching modes (EPS, OCS, and OBS) are concurrently utilized. As illustrated, four wavelengths $w_0$-$w_3$ configured in different switching modes in the same incoming optical fiber connected to WDM port 1 740 of the RA- OBS core router 700. In the OBS mode, wavelength $w_0$ is the control wavelength to carry the burst header packets, and wavelength $w_1$ is the data wavelength to carry data bursts. Wavelength $w_2$ is set to the EPS mode and is used to carry packets which are switched electronically. Wavelength $w_3$ is utilized for OCS mode, and any data sent on that wavelength follows the pre-established lightpath in the optical switching fabric to the desired output. Each of these four wavelengths may be switched based the operation of the particular switching mode described previously in reference to FIGS. 3 and 4a-4d. These wavelengths utilized for different switching modes are routed according to the switching mode being utilized and combined onto the outgoing DWDM links.

For the purposes of illustration, an exemplary illustrative example is provided in FIG. 5. Four wavelengths utilizing different switching modes are received at WDM port 1 740. DEMUX 705 separates the different wavelengths and provides the wavelengths to optical switching fabric 710. Optical switching fabric 710 directs the wavelengths to particular output in accordance with the particular switching mode being utilized for the wavelengths. Wavelength $w_0$ is utilized as the control wavelength for an OBS mode so optical switching fabric 710 directs $w_0$ to O/E converter 715. As a result, the burst header packets are processed by electronic switching fabric 720 and RRC unit 725. The burst header packet is then outputted to E/O converter 730. Data wavelength $w_1$ is utilized for the data burst in an OBS mode. In the particular illustrative example shown, wavelength conversion does not occur to the data burst. Thus, optical switching fabric 710 may provide data burst on wavelength $w_1$ and burst header packets on control wavelength $w_0$ to MUX 735 for multiplexing and output on a desired port, such as WDM port 2 745. However, note that wavelength conversion may occur in the OBS mode as illustrated previously in FIG. 4d.

Packet(s) arriving on wavelength $w_2$ for an EPS mode are processes by O/E converter 715, electronic switching fabric 720, and E/O converter 730 to allow the packets to be processes electronically in accordance with an EPS mode. After processing, the packets are routed to a desired port, such as WDM port 0 750. MUX 735 multiplexes the data for WDM port 0 750 and outputs the data to the WDM link.

Data on wavelength $w_3$ for an OCS mode is received at WDM port 1 740. In the particular illustrative example shown, wavelength conversion does not occur. Thus, data on wavelength $w_3$ is not wavelength converted, and is routed through optical switching fabric 710 on an established lightpath for the OCS mode to WDM port 0 750 without leaving the optical domain. However, note that wavelength conversion can occur in the OCS mode as illustrated in FIG. 4b. MUXs 735 may combine several channels received at one of the WDM ports. For example, MUX 735 for WDM port 0 750 combines wavelength $w_2$ for an EPS mode and wavelength $w_3$ for an OCS mode. Further, each WDM port may support multiple switching modes, including different switching modes and/or the same switching mode. For example, a single WDM port may support EPS, OCS, and OBS switching modes, or a single WDM port may support two channels utilizing an EPS switching mode.

As illustrated in FIG. 5, RA-OBS core router 700 can support concurrent DWDM multi-mode switching on an integrated router platform. In addition, with this novel architecture, additional DWDM channels can be added without increasing the number of O/E/O pairs, greatly reducing the system cost.

Figure 6A:
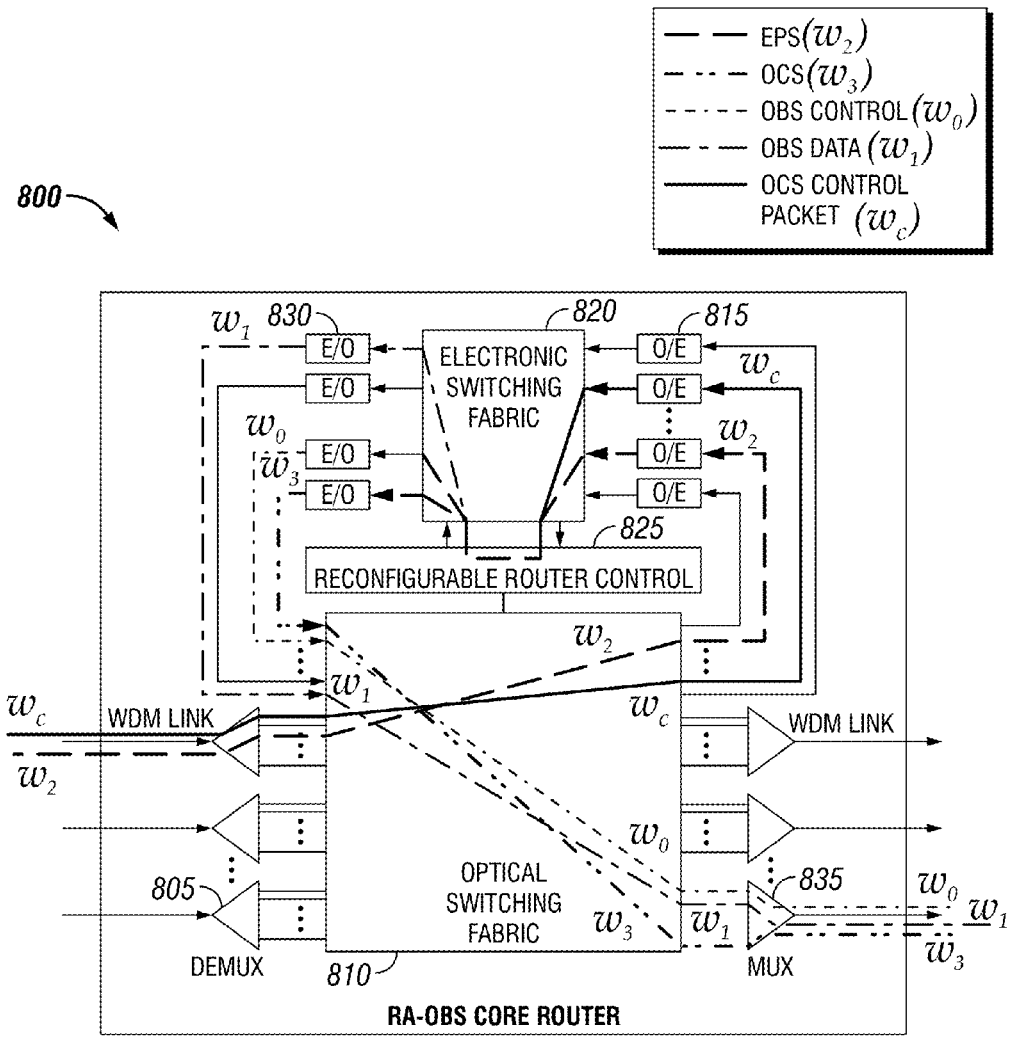
FIGS. 6a-6c are illustrative implementations of a RA-OBS core router providing dynamic reconfiguration from an (a) EPS mode, (b) OCS mode, and (c) OBS mode.
Figure 6B:
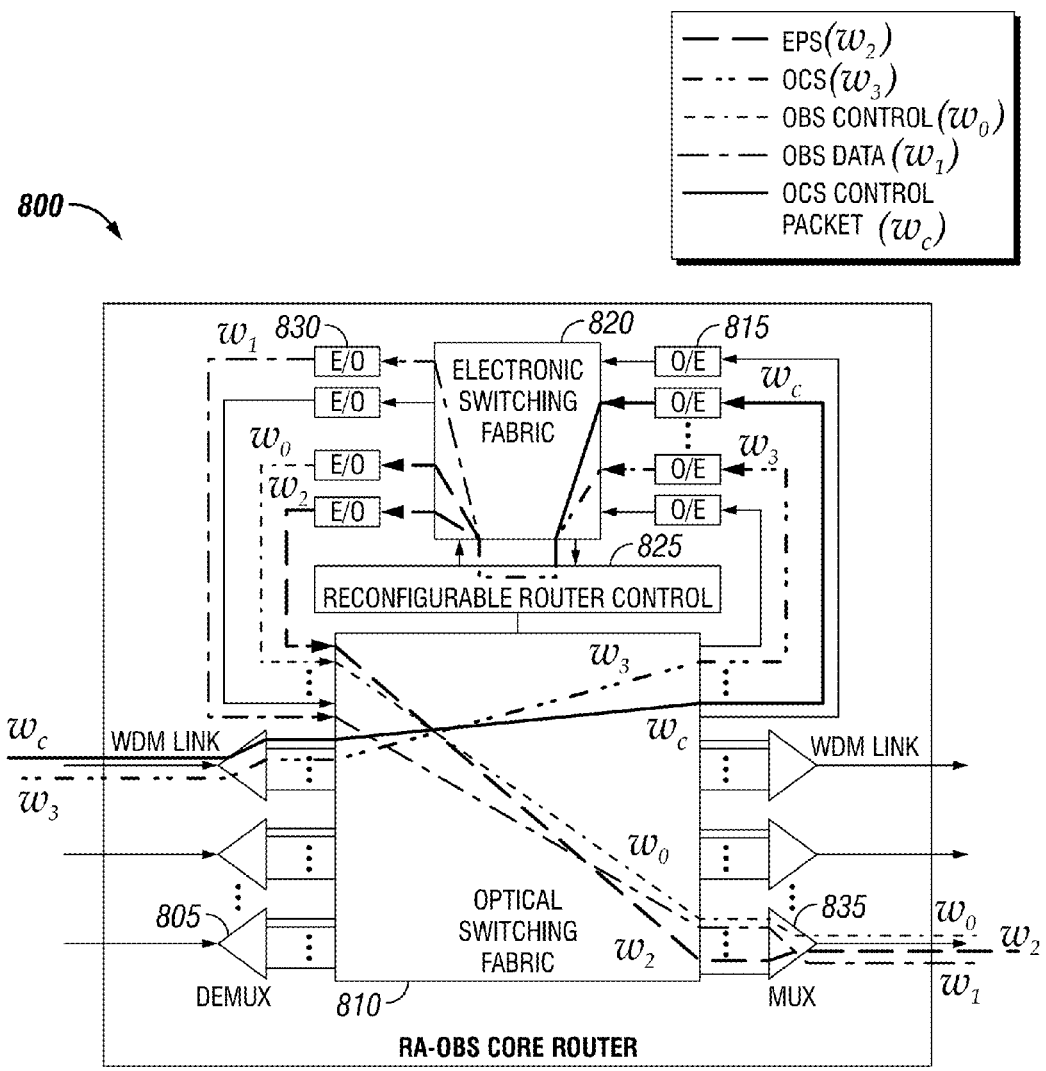
Figure 6C:
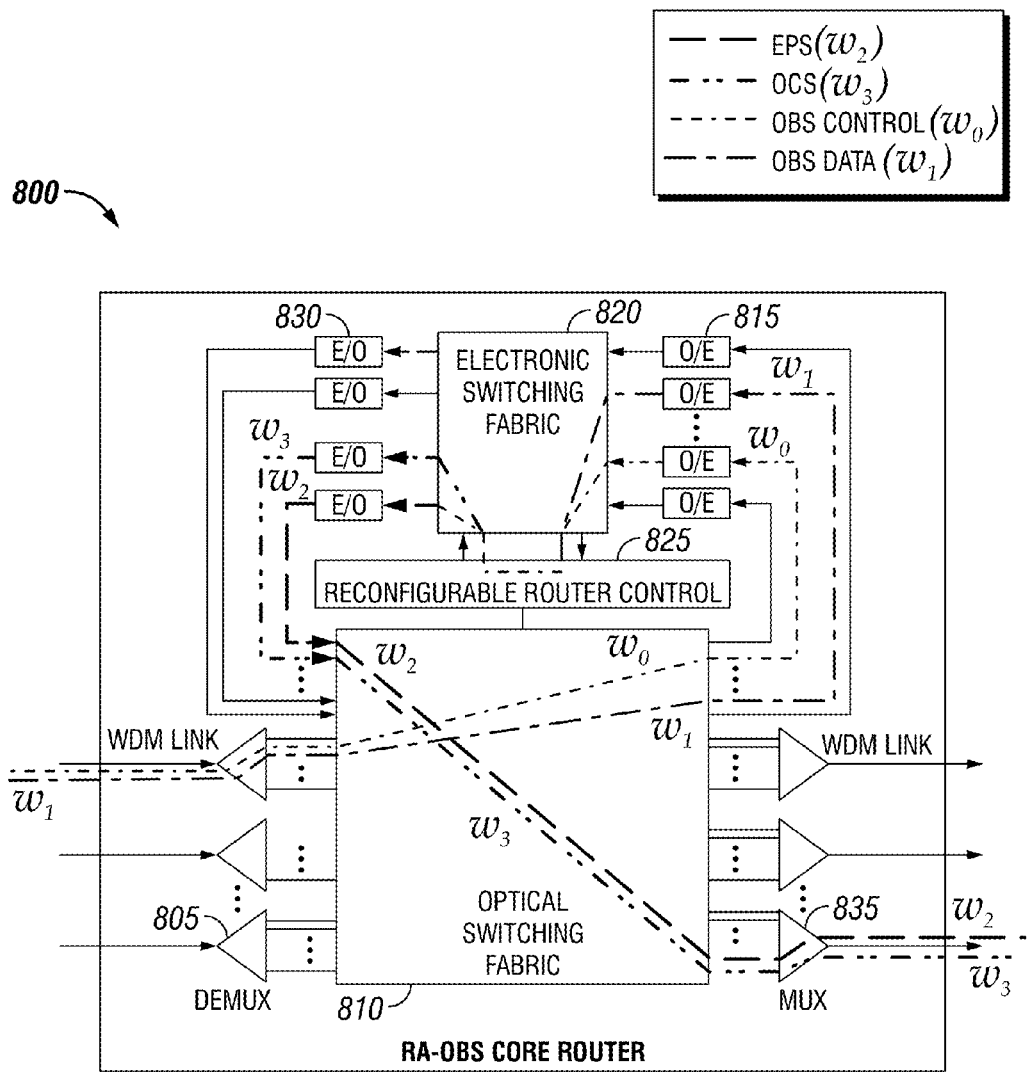

FIGS. 6a-6c are illustrative implementations of a RA-OBS core router providing dynamic reconfiguration. RA-OBS core router(s) 800 may support dynamic mode reconfiguration where each DWDM wavelength channel can be dynamically reconfigured into a different switching mode, subject to the system resource availability. This may require the use and configuration of at least one control wavelength for each input and output DWDM port. To achieve this, DEMUX 805 separates different wavelengths. A lightpath is first established for control data on the control wavelength $w_0$ in optical switching fabric 810 to route the incoming control wavelength to O/E converter 815. A corresponding input port processor for control wavelength $w_0$ in electronic switching fabric 820 is configured to route the control data to RRC unit 825 for processing. A destination port address of electronic switching fabric 820 corresponds to a particular switching mode that the data is being converted into. RRC unit 825 processes the control data, and when reconfiguration to a different switching mode is desired, electronic switching fabric 820 is setup to route data the control data to a destination port address utilized for a desired switching mode. Additionally, the other data may also be processed by RRC unit and routed through electronic switching fabric 820 to E/O converters 830 in accordance with the desired switching mode. Next, a lightpath is configured to route the outgoing control wavelength to the destination output port through optical switching fabric 810. The data is then multiplexed by MUX 835 and output to the DWDM link.

Dynamically reconfiguring the wavelengths when RA-OBS core router 800 is used in each of these above described switching modes (EPS, OCS, and OBS) is described below. A single control packet can be used to configure the mode of a wavelength in the RA-OBS core routers along the path, or a plurality of control packets can be used to configure individual core routers.

FIG. 6a is an illustrative implementation of a RA-OBS core router 800 providing dynamic reconfiguration from an EPS switching mode to another switching mode. EPS control packet(s), which are not normally provided in an EPS mode, are sent on pre-configured control wavelength $w_0$ can be used to configure/reconfigure a wavelength in the EPS mode. To reconfigure an incoming data wavelength in the EPS mode into a different switching mode, a lightpath is set up in optical switching fabric 810 to route the incoming wavelength to an available O/E converter 815. RRC unit 825 processes the converted configuration packets and incoming data to provide for reconfiguration to an OCS or OBS switching mode. In accordance with the reconfiguration information provided on the control wavelength $w_0$, RRC unit 825 may setup optical lightpath routing in optical switching fabric 810 and electrical routing in electronic switching fabric 820 as necessary for dynamic reconfiguration to a different switching mode. Electronic switching fabric 820 routes data on EPS wavelength $w_2$ to RRC unit 825 for any processing that may be necessary to convert the EPS data to a different switching mode. EPS wavelength $w_2$ and control wavelength $w_0$ are routed to E/O converter(s) 830 in accordance with the switching mode that the data is being converted to. E/O converter(s) 830 are selected and configured to produce a desired wavelength for a desired switching mode. In the case of conversion to an OCS mode, the data is provided to an E/O converter 830 allocated for output data at a desired wavelength $w_3$ for an OCS mode. In the case of reconfiguration from EPS mode to OBS mode, electronic switching fabric outputs the control wavelength and data burst to different E/O converters 830 for providing the separated control wavelength $w_0$ and data burst wavelength $w_3$ utilized in an OBS mode. A lightpath is then set up in optical switching fabric 810 to route the wavelengths to the desired output port of the RA-OBS core router.

FIG. 6b is an illustrative implementation of a RA-OBS core router providing dynamic reconfiguration from an OBS switching mode to different switching mode. Allocating an outgoing wavelength in a different switching mode is achieved by sending an OCS mode control packet(s) $w_c$, which are not normally provided in an OCS mode, to the RRC unit 825. Optical switching fabric 810 receives OCS mode control packet(s) $w_c$ and routes the packet to an O/E converter 815. RRC unit 825 receives OCS mode control packet(s) $w_c$ from electronic switching fabric 820 and processes the control data. OCS data provided on a data wavelength $w_3$ allocated for the OCS mode is routed through an O/E converter 815 and electronic switching fabric 820. Data wavelength $w_3$ is processed by RRC unit 825 for conversion to a different switching mode. In the case of conversion to an EPS mode, the data is provided to an E/O converter 830 allocated to output data for a desired wavelength $w_2$ in an EPS mode. In the case of reconfiguration to OBS mode, electronic switching fabric outputs the control wavelength $w_0$ and data burst $w_1$ to different E/O converters 830 for providing the separated control wavelength and data burst utilized in an OBS mode.

FIG. 6c is an illustrative implementation of a RA-OBS core router providing dynamic reconfiguration from an OBS switching mode to another switching mode. Similar to dynamic reconfiguration of OCS and EPS modes, allocating an outgoing wavelength in the OBS mode is achieved by providing a control wavelength $w_0$ to RRC unit 825. In an OBS mode, a control wavelength $w_0$ may be allocated for burst header packets. The control wavelength $w_0$ may also be utilized to provide dynamic reconfiguration information. Control wavelength $w_0$ is sent RRC unit 825 via O/E converter 815 and electronic switching fabric 820 for processing. When dynamic reconfiguration to a different switching mode is desired, incoming data burst on data wavelength $w_1$ are routed to RRC unit 825 for processing to output the data in a different switching mode. In the case of conversion to an OCS mode, the data is provided to an E/O converter 830 allocated for output data at a desired wavelength $w_3$ in an OCS mode. In the case of reconfiguration to EPS mode, electronic switching fabric 820 outputs the data to an E/O converter 830 allocated for outputting the data at a desired wavelength $w_2$ in an EPS mode.

Figure 7:
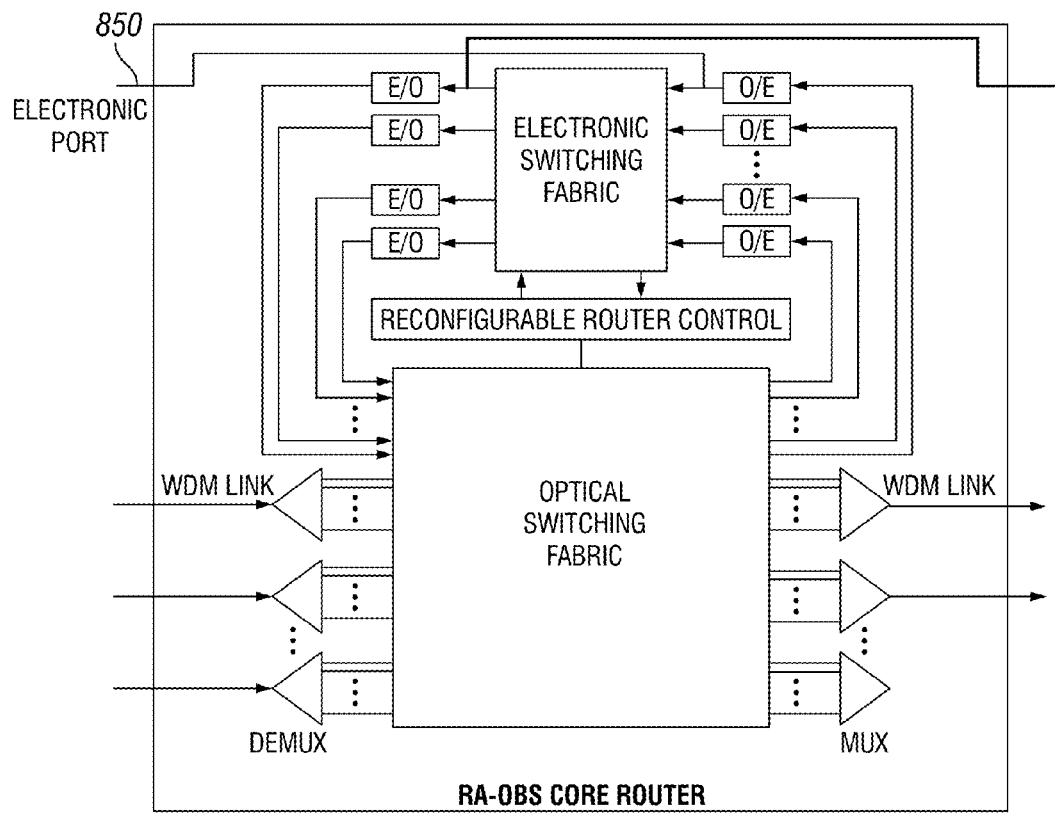
FIG. 7 is an illustrative implementation of a RA-OBS core router providing electronic switching ports.

FIG. 7 is an illustrative implementation of a RA-OBS core router providing electronic switching port(s) 850, in replacement of, or in combination with, optical ports. Electronic switching port(s) 850 route electronic data directly to electronic switching fabric. While electronic ports are more expensive, they provide: (a) the finest switching granularity among all switching modes, and (b) wavelength conversion to the OBS and OCS modes. At any given time, an electronic switching port can be used to (1) process one wavelength electronically in the EPS mode; (2) perform wavelength conversion on a connection basis in the OCS mode; (3) perform wavelength conversion on a burst by burst basis in the OBS mode; and (4) receive and forward control packets. Because of the flexible architecture of the RA-OBS core router, the electronic switching ports can be dynamically shared among (1) different ports; (2) different switching modes; and (3) control wavelengths from different ports.

Figure 8:
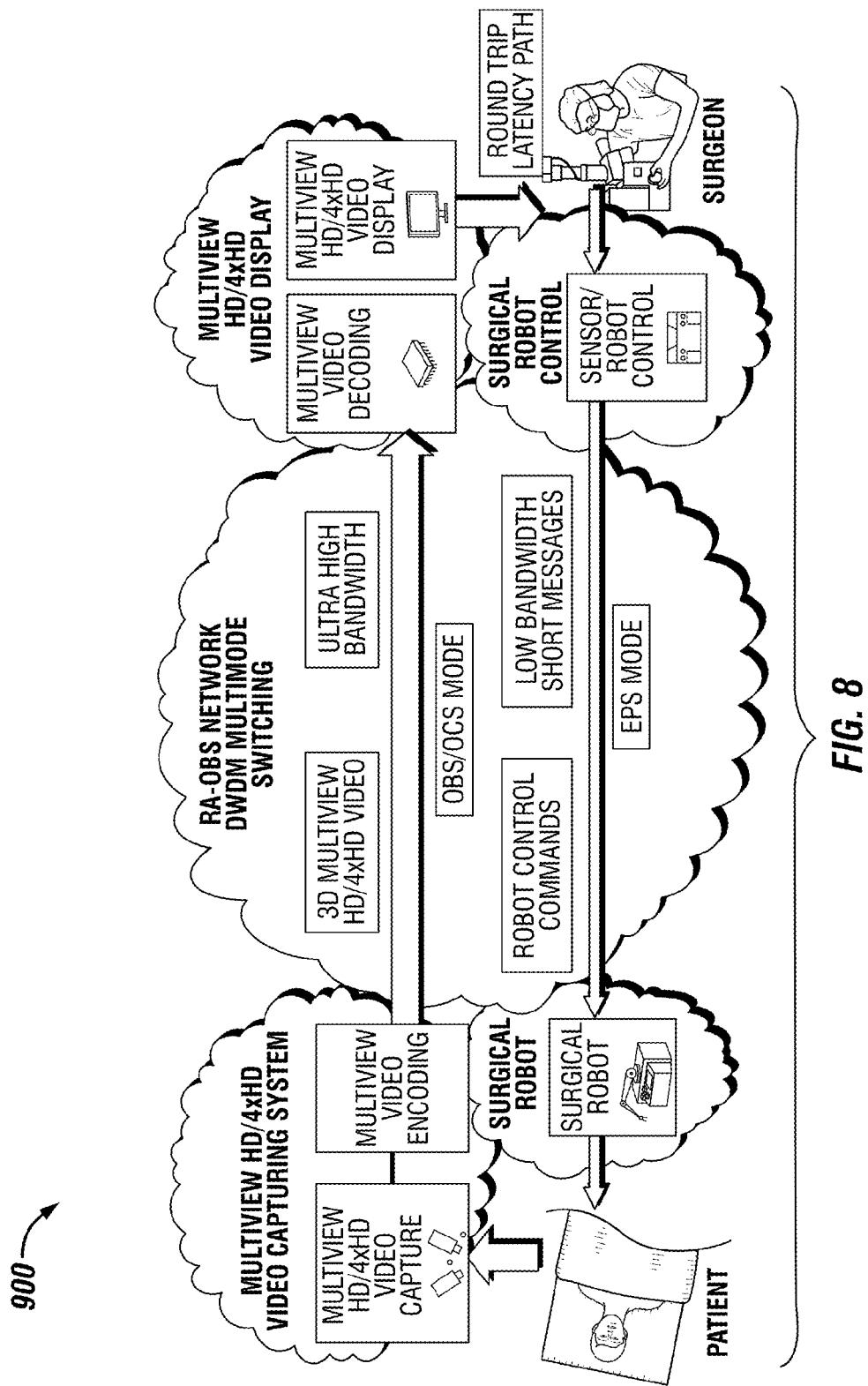
FIG. 8 is an illustrative implementation of an RA-OBS network supporting telesurgery.

FIG. 8 is an illustrative implementation of an RA-OBS network 900 supporting end-to-end applications such as telesurgery or telemedicine. RA-OBS architecture provides a versatile platform to allow individual applications, as well as different types of the messages within an application, to use different switching modes. Telesurgery allows a surgeon at a remote location to perform surgery on with the help of surgical robots near a patient. For example, surgical robots have been used by surgeons a few feet away from the patient using optical fiber connections to conduct minimally invasive surgeries, which replace traditional open surgeries with 1-2 cm incisions. It may be desirable to allow robotic surgery systems, such as da Vinci® Surgical Systems, to be operated over long distances. However, network bandwidth, latency, and jitter (variation of latency), are major obstacles to widespread use of such technology.

In telesurgery, a surgeon controls the movement of the remote surgical robot while high definition (HD) cameras, which may be multi-view 3-D HD video, capture the resulting action on the patient and sent video back to the surgeon. Round-trip latency, as opposed to one-way latency, determines the safety of telesurgery because it is important that the surgeon is viewing realtime video of the patient and surgical robot. Telesurgery has interesting characteristics which we call asymmetric data transfers: (1) Ultra high bandwidth HD/4×HD (four times the resolution of standard HD for medical use) video from the remote patient site to the surgeon site; and (2) Low bandwidth short robot control commands from the surgeon site to the remote patient site. The HD video consists of a series of frames, each containing millions of pixels. In the case of 3-D multi-view HD/4×HD video, two video streams, the left and right views needed for stereoscopic view regeneration, are transported. When pixels in a frame are transmitted through a network, each pixel experiences a different delay. For example, the last pixel in a video frame experiences the longest delay. Network latency and jitter can cause delayed or stalled video at the surgeon site. In addition, different delays experienced by the left view and right view frames in multi-view video can cause blurred 3-D video, threatening the safety of the surgery. The multi-mode switching as described herein can support any data/video/voice services.

In the RA-OBS network 900, an OBS mode or OCS mode can be used for transferring high bandwidth HD video in the forward direction, and the EPS mode can be used to transfer short robot control messages in the reverse direction. This example provides one illustration of how RA-OBS architecture enables an intrinsic mapping of the characteristics of each message type to the most suited switching mode. Other applications include, but are not limited to, video conferencing, Voice-over-IP (VoIP), Cloud Computing, multi-party video gaming, video-on-demand, web browsing, network virtualization, telemedicine, wireless over optical network, network-based control systems, peer-to-peer network, storage network, server farm, online commerce, online banking, virtual private network, business-to-business (B2B), Business-to-Government (B2G), streaming video, email, data downloading, network-based security systems, network-based applications on smart phones, e-books, tablets, grid computing, internetworking, and any current and future network-based applications.

While the Dense Wavelength Division Multiplexing (DWDM) multi-mode switching systems and methods discussed herein specifically focuses on router architecture, one of ordinary skills in the art, will recognize the applicability of this approach to other types of designs and applications that can significantly impact how IP and optical networks can be efficiently implemented which would affect the evolution of future networks.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. A core router system for multi-mode switching comprising:
   a wavelength division multiplexed (WDM) input link receiving data, wherein the data is provided in an electronic packet switching (EPS) mode, optical circuit switching (OCS) mode, and optical burst switching (OBS) mode, and the data is provided in a plurality of channels that are allocated for one of the EPS mode, OCS mode, or OBS mode;
   an optical switching fabric receiving the channels, wherein the optical switching fabric routes each of the plurality of channels to a desired output port in accordance with a switching mode;
   at least one O/E converter receiving optical data, wherein the O/E converter converts the optical data into electronic data;
   an electronic switching fabric coupled to the at least one O/E converter, wherein the electronic switching fabric routes the electronic data to a desired electronic output port in accordance with the switching mode;
   at least one E/O converter coupled to the electronic switching fabric, wherein the E/O converter converts received electronic data into outgoing optical data, and the outgoing optical data is provided to the optical switching fabric; and
   a WDM output link coupled to the optical switching fabric, wherein the WDM output link outputs outgoing WDM data.

2. The system of claim 1, further comprising a demultiplexer coupled to the WDM input link, wherein the demultiplexer separates the data received at the WDM input link into the plurality of channels.

3. The system of claim 1, further comprising a multiplexer coupled to the optical switching fabric, wherein the multiplexer combines received data from the optical switching fabric into the outgoing WDM data.

4. The system of claim 1, further comprising a reconfigurable router control (RRC) coupled to the optical switching fabric and the electronic switching fabric, wherein the RRC unit configures the optical switching fabric and the electronic switching fabric in accordance with received control data.

5. The system of claim 4, wherein one of the plurality of channels is allocated as an OBS control channel and one of the plurality of channels is allocated as an OBS data channel.

6. The system of claim 5, wherein the optical switching fabric routes the OBS control channel to the O/E converter for conversion into electronic OBS control data, and the RRC unit in accordance with the electronic OBS control data sets up a lightpath in the optical switching fabric to route the OBS data channel to the WDM output link.

7. The system of claim 5, the optical switching fabric routes the OBS control channel to the O/E converter for conversion into electronic OBS control data, the optical switching fabric routes the OBS data channel to a second O/E converter for conversion to electronic OBS data, and the electronic switching fabric routes the electronic OBS data to a second E/O converter converting the electronic OBS data into outgoing optical OBS data, said outgoing optical OBS data having a different wavelength than the OBS channel.

8. The system of claim 1, wherein core router system converts an incoming wavelength of one of the plurality of channels to an outgoing wavelength different from said incoming wavelength.

9. The system of claim 1, wherein one of the plurality of channels is allocated as an EPS channel.

10. The system of claim 9, wherein the optical switching fabric routes the EPS channel to the O/E converter for conversion; and the electronic switching fabric routes the electronic packet to the E/O converter for conversion to the outgoing optical data.

11. The system of claim 1, wherein one of the plurality of channels is allocated as an OCS channel.

12. The system of claim 11, wherein the optical switching fabric routes the OCS channel to the desired output port, and the OCS channel is outputted to the WDM output link.

13. The system of claim 11, wherein the optical switching fabric routes the OCS channel to the O/E converter for conversion into the electronic data, and the electronic switching fabric routes the electronic data to the E/O converter for conversion to the outgoing optical data, said outgoing optical data having a different wavelength than the OCS channel.

14. An edge router system for multi-mode switching comprising:
   a line interface receiving incoming data;
   an ingress traffic manager coupled to the line interface, wherein the ingress traffic manager processes the incoming data for output in an electronic packet switching (EPS) mode, optical circuit switching (OCS) mode, and optical burst switching (OBS) mode;
   a multiplexer coupled to the ingress traffic manager, wherein the multiplexer combines the incoming signals and outputs an outgoing wavelength division multiplexed (WDM) link;
   a demultiplexer receiving an incoming WDM link, wherein the demultiplexer separates the incoming WDM link into a plurality of channels, and the plurality of channels are allocated for the EPS mode, OCS mode, and OBS mode; and
   an egress traffic manager coupled to the demultiplexer, wherein the egress traffic manager processes the incoming WDM link to output data in the electronic packet switching (EPS) mode, optical circuit switching (OCS) mode, and optical burst switching (OBS) mode to the line interface.

15. The system of claim 14, wherein the ingress traffic manager comprises a classifier receiving incoming data, wherein the classifier classifies data according to the switching mode.

16. The system of claim 15, wherein the ingress traffic manager further comprises an EPS ingress processor receiving incoming EPS data from the classifier, wherein the EPS ingress processor outputs the incoming EPS data in an EPS format.

17. The system of claim 16, wherein the ingress traffic manager further comprises an OBS ingress processor receiving incoming OBS data from the classifier, wherein the OBS ingress processor outputs the incoming OBS data in an OBS format.

18. The system of claim 17, wherein the ingress traffic manager further comprises an OCS ingress processor receiving incoming OCS data from the classifier, wherein the OCS ingress processor outputs the incoming OCS data in an OCS format.

19. The system of claim 14, wherein the egress traffic manager comprises an EPS egress processor receiving outgoing EPS data, wherein the EPS egress processor processes the outgoing EPS data for output to the network.

20. The system of claim 19, wherein the egress traffic manager further comprises an OBS egress processor receiving outgoing OBS data, wherein OBS egress processor processes the outgoing OBS data for output to the network.

21. The system of claim 20, wherein the egress traffic manager further comprises an OCS egress processor receiving outgoing OCS data, wherein the OCS egress processor processes the outgoing OCS data for output to the network.

22. The system of claim 21, wherein the egress traffic manager further comprises a classifier receiving the outgoing EPS, OBS, and OCS data, wherein the classifier outputs the outgoing EPS, OBS, and OCS data to the line interface.

23. The system of claim 14, further comprising one or more DWDM transmitters coupled to the ingress traffic manager, wherein the DMDM transmitters converts the incoming data into a optical format for output to the multiplexer.

24. The system of claim 14, further comprising one or more DWDM receivers coupled to the demultiplexer, wherein the DMDM transmitters converts the plurality of channels into an electronic format for output to the egress traffic manager.

25. A method for wavelength division multiplexed (WDM) multi-mode switching comprising:
receiving at least one wavelength division multiplexed (WDM) link, wherein the WDM links provides a plurality of channels, and the plurality of channels is allocated for an electronic packet switching (EPS) mode, optical circuit switching (OCS) mode, and optical burst switching (OBS) mode;
routing each of the plurality of channels to a desired output port of an optical switching fabric in accordance with an allocated switching mode corresponding to the channel; and
combining a plurality of outputs from the optical switching fabric for output on at least one WDM output link.

26. The method of claim 25, further comprising processing channel data provided by each of said channels according to said switching mode corresponding to the channel for output in an optical format.

27. The method of claim 25, further comprising converting an incoming wavelength of one of the plurality of channels into an outgoing wavelength different from said incoming wavelength.

28. The method of claim 25, wherein one of the plurality of channels is allocated as an EPS channel.

29. The method of claim 28, further comprising routing the EPS channel for conversion to electronic data; wherein an electronic switching fabric routes the electronic data for conversion to a desired optical channel; and
routing the desired optical channel through the optical switching fabric for output on a desired WDM link.

30. The method of claim 25, wherein one of the plurality of channels is allocated as an OCS channel.

31. The method of claim 30, further comprising routing the OCS channel to a desired output port of the optical switching fabric.

32. The method of claim 30, further comprising routing the OCS channel for conversion to electronic data, wherein an electronic switching fabric routes the electronic data for conversion to outgoing optical data on a outgoing OCS channel, and the outgoing OCS channel has an outgoing wavelength different from an incoming wavelength of the OCS channel.

33. The method of claim 25, wherein one of the plurality of channels is allocated as an OBS control channel and one of the plurality of channels is allocated as an OBS data channel.

34. The method of claim 33, further comprising routing the OBS control channel for conversion to electronic control data, wherein the electronic control data provides routing information for the OBS data channel; and
routing the OBS data channel to a desired output port of the optical switching fabric in accordance with electronic control data.

35. The method of claim 33, further comprising routing the OBS control channel for conversion to electronic control data, wherein the electronic control data provides routing information for the OBS data channel; and
routing the OBS data channel for conversion into electronic OBS data, wherein an electronic switching fabric routes the electronic OBS data for conversion into an outgoing OBS data channel on an outgoing wavelength different from an incoming wavelength of the OBS data channel.

* * * * *